US012096213B2

(12) United States Patent
Drubay et al.

(10) Patent No.: US 12,096,213 B2
(45) Date of Patent: Sep. 17, 2024

(54) METHOD AND SYSTEM FOR ACQUIRING, SAVING AND USING EVIDENCE DATA

(71) Applicant: Imprimerie Nationale, Paris (FR)

(72) Inventors: Stéphane Drubay, Flines-lez-Raches (FR); Thomas Foutrein, Lys Lez Lannoy (FR); Jean-François Demeestere, Paillencourt (FR)

(73) Assignee: IMPRIMERIE NATIONALE, Paris (FR)

( * ) Notice: Subject to any disclaimer, the term of this patent is extended or adjusted under 35 U.S.C. 154(b) by 200 days.

(21) Appl. No.: 17/617,830

(22) PCT Filed: Jun. 10, 2020

(86) PCT No.: PCT/EP2020/066013
§ 371 (c)(1),
(2) Date: Dec. 9, 2021

(87) PCT Pub. No.: WO2020/249581
PCT Pub. Date: Dec. 17, 2020

(65) Prior Publication Data
US 2022/0217533 A1 Jul. 7, 2022

(30) Foreign Application Priority Data

Jun. 10, 2019 (FR) ...................................... 1906144

(51) Int. Cl.
*H04W 12/06* (2021.01)
*H04L 9/32* (2006.01)
*H04W 4/80* (2018.01)

(52) U.S. Cl.
CPC ............. *H04W 12/06* (2013.01); *H04L 9/321* (2013.01); *H04L 9/3236* (2013.01);
(Continued)

(58) Field of Classification Search
CPC ........ H04W 12/06; H04W 4/80; H04L 9/321; H04L 9/3236; H04L 9/3247; H04L 9/3297
See application file for complete search history.

(56) References Cited

U.S. PATENT DOCUMENTS 9,503,452 B1 * 11/2016 Kumar ................ H04L 63/0838
9,747,768 B1    8/2017 Zehler et al.
(Continued)

FOREIGN PATENT DOCUMENTS

WO    WO 2014/140814 A2    9/2014

OTHER PUBLICATIONS

National Industrial Property Institute, Preliminary Search Report and Written Opinion received for Application No. FR 1906144, mailed Jan. 21, 2020, 7 pages, Republic of France.
(Continued)

*Primary Examiner* — Quazi Farooqui
(74) *Attorney, Agent, or Firm* — BakerHostetler (57) ABSTRACT

The invention relates to a method and a system for generating and saving a set of digital data or evidence associated with an individual within a system including several devices issuing and receiving evidence and a medium for communicating between the devices, which may include:
  For the generation of the data constituting evidence by a device, the definition of a data block characterizing the evidence,
  For the individual wishing to build him/herself a set of evidence, adding to the received data block data characterizing a piece of evidence, a datestamp parameter, an indicator identifying the device receiving a piece of evidence, an evidence signature.
  In order to use a piece of evidence, an individual issues a request containing the evidence proving that he/she is the recipient of this evidence to a third-party system.
(Continued)

The third-party system contacts the device issuing the evidence which re-signs.

9 Claims, 9 Drawing Sheets

(52) U.S. Cl.
 CPC .......... *H04L 9/3247* (2013.01); *H04L 9/3297* (2013.01); *H04W 4/80* (2018.02)

(56) References Cited

U.S. PATENT DOCUMENTS

| | | | |
|---|---|---|---|
| 2011/0109508 A1 | 5/2011 | Wolman et al. | |
| 2014/0282877 A1* | 9/2014 | Mahaffey | H04W 12/33 726/3 |

OTHER PUBLICATIONS

International Searching Authority, International Search Report (ISR) and Written Opinion received for International Application No. PCT/EP2020/066013, mailed Aug. 28, 2020, 12 pages, European Patent Office, Netherlands.

\* cited by examiner

METHOD AND SYSTEM FOR ACQUIRING, SAVING AND USING EVIDENCE DATA

CROSS-REFERENCE TO RELATED APPLICATIONS

The present application is a national stage application filed under 35 U.S.C. § 371 of PCT/EP2020/066013 filed Jun. 10, 2020, which application claims priority to French Patent Application No. 1906144, filed Jun. 10, 2019, the entire contents of which are hereby incorporated by reference in their entirety for all purposes.

TECHNICAL FIELD

The invention relates to a system and a method for generating a data stream or a data set composed of datestamp data and potentially of data specific to an individual or to a set of individuals, and for saving said data.

It is, for example, used by an individual to acquire and store dated localization data, in order to allow him/her to prove his/her presence in a given place, at a given date and time or his/her presence in the vicinity of other persons in his/her surroundings. The invention also allows it to be proved that an individual has indeed carried out an action. The evidence takes the form of digital data that will be stored, for example, in a database or a local or external memory in order to be printed if need be on a document or displayed on a digital or other device.

BRIEF SUMMARY

It is sometimes necessary for an individual to have at his/her disposal data proving his/her presence in a place, one or more actions completed on a system, or else his/her proximity with other individuals at a given time in a defined place or space. This evidence may be used in the context of an inquiry in order to bear witness to an event or else to justify an opinion on a place or a service. For this purpose, it is necessary to gather various pieces of evidence, taking the form, for example:
  of a testimony of another person,
  of a photo or of a certified document attesting to their presence,
  of coordinates coming from a positioning system, of GPS (Global Positioning System) type.

Another solution consists in accepting to be tracked or traced by a third-party system, for example:
  a video-surveillance system,
  an automatic recording of the position of GPS (Global Positioning System) type,
  a navigation system.

The latter systems do not really respect personal privacy, the confidentiality of an individual, unless they are only activated by the individual when the latter knows or anticipates the fact that he/she will need definite and irrefutable evidence of his/her presence in a given place or else of an action that he/she has carried out.

On the other hand, finding witnesses or certifying a document are not always easy acts.

The idea of the present invention is to provide a system which is activated by an individual when he/she needs to acquire and to save a data set that will be denoted in the following part of the description under the term "evidence". The word "evidence" notably encompasses the proof of presence of an individual in a place, at a given date and time, the proof of proximity of the individual with respect to another individual or to a device, the proof of action or of use by the individual on a good or a service, or furthermore any other evidence useful to an individual or to a user. Examples of evidence are given later on in the description. The word "individual" or "user" will be used in an equivalent manner.

The method and the system according to the invention notably rely on an exchange of data between a user and a device or other users. This exchange is upon the initiative of a user who wishes to build him/herself a database containing for example dated localization data and potentially data associated with actions that he/she has carried out.

In the following part of the description the term "evidence" denotes a data structure associated with an individual that the individual may store in a database either locally or on a storage server.

The invention relates to a method for generating and saving a set of digital data or evidence associated with an individual, within a system comprising several devices issuing and receiving evidence and a medium for communicating between said devices, characterized in that it comprises at least the following steps:

For the generation of the data constituting a piece of evidence:
  For a device issuing a piece of evidence, define a data block characterizing the evidence, the data block comprising at least one datestamp parameter, an indicator identifying said device issuing the evidence, evidence data, a signature of the transmission data by a transmission device,
  For the individual wishing to build him/herself a set of evidence, add to the received data block data characterizing a piece of evidence, a datestamp parameter, an indicator identifying the device receiving a piece of evidence, an evidence signature, In order to use a piece of evidence:
An individual issues a request containing said evidence proving that he/she is the recipient of this evidence to a third-party system,
Said third-party system contacts the device issuing the evidence sending to it at least said datestamp parameter, said indicator identifying the device issuing the evidence, said evidence data, the issuer signs said blocks and sends the signature back to the third-party system which compares said signature with said original signature, in order for the third-party system to validate the evidence in the case where the signatures match.

The method may furthermore comprise the following steps:
  A device issuing proximity evidence generates a set of transmission data composed of a part containing datestamp parameters, a transmission identifier of the device issuing the evidence, a signature of the transmission data,
  An individual receives proximity evidence issued by an issuing device and stores said proximity evidence adding datestamp data and data identifying the proximity evidence receiver device,
  In order to search for proximity evidence, said individual issues an evidence search request to a third-party system which transmits the datestamp data contained in the request and the indicator to the server storing the data.

The method may comprise the following steps:

A presence terminal

Generates a transmission data block comprising at least a datestamp parameter, an identifier, proximity data, Generates an encryption file from the data (hash) and signs the encrypted data, Issues the presence evidence to a user requesting said data, said user storing said presence evidence after having added datestamp data and an indicator of the device receiving the evidence, In order for an individual to search for presence evidence, said individual issues an evidence search request to a third-party system which transmits the datestamp data contained in the request and his/her identifier to the server storing the data, When the evidence is found in the storage of the data, the third-party service validates the evidence. It may also comprise at least the following steps:

A device generates action evidence by transmitting to an individual a data set containing datestamp parameters, an identifier, data characterizing the action, then encrypts the data with a public key of the individual, generates a hash and a signature of the hash of the transmission data, Said device issues said action evidence to the individual and/or onto a storage space.

The method may furthermore comprise the following steps:

An evidence search request is transmitted by a first user $U_1$ to a broadcast server, The broadcast server searches for an evidence issuing device and generates a random sequence, The random sequence is transmitted to the user $U_1$ for signature, the user $U_1$ signs the random sequence and retransmits it to the broadcast server which triggers a procedure to search for a user $U_2$ holding a piece of evidence required by the first user $U_1$, The broadcast server transmits, to the second user $U_2$, the indicator identifying the device issuing the evidence.

If the second user has the evidence at his/her disposal, he/she transmits to the broadcast server a message containing the signature of the transmission data of the proximity evidence, The broadcast server compares the signature transmitted by the second user $U_2$ with the signature of the transmission block contained within the evidence in order to ensure that the second user U2 is in possession of the evidence, then generates a corresponding random sequence, The random sequence associated with the second user is transmitted to the latter for signature, prior to retransmission of the signed random sequence to the broadcast server which verifies the signatures prior to establishing a communication between the first user $U_1$ requesting proximity evidence and the second user $U_2$ holding the evidence of use by transmission of the addresses of each of the users.

The invention also relates to a system for building a data set corresponding to a piece of evidence associated with a first user $U_1$ within a system comprising one or more evidence issuing devices communicating with one another via a communications protocol, a broadcast server and a storage space characterized in that it comprises at least the following elements:

A device issuing the evidence is equipped with communication means and with an application configured for generating a data set comprising a datestamp data value, an identifier, data characterizing a piece of evidence, a parameter for signature of the data, Said first user is equipped with communication means and with an evidence portfolio application configured for adding to a received data set a datestamp parameter, an indicator identifying the device issuing the data set, a signature, an encryption key, A third-party device configured for contacting the device issuing the evidence sending to it at least said datestamp parameter, said indicator identifying the device issuing the evidence, said evidence data, the issuer signs said blocks and sends the signature back to the third-party system configured for comparing said signature with said original signature, and for validating the evidence in the case where the signatures match.

The transmitter/receiver device is configured for communicating via Wifi, radio, Bluetooth.

The storage space is, for example, located on a storage server.

A device issuing the evidence may be an action terminal configured for issuing a piece of evidence indicating that an action has been carried out by an individual.

BRIEF DESCRIPTION OF THE SEVERAL VIEWS OF THE DRAWING(S)

Other features and advantages of the present invention will become more clearly apparent upon reading the description of exemplary embodiments given by way of illustration and from the appended figures, wherein, respectively.

DETAILED DESCRIPTION

Figure 1:
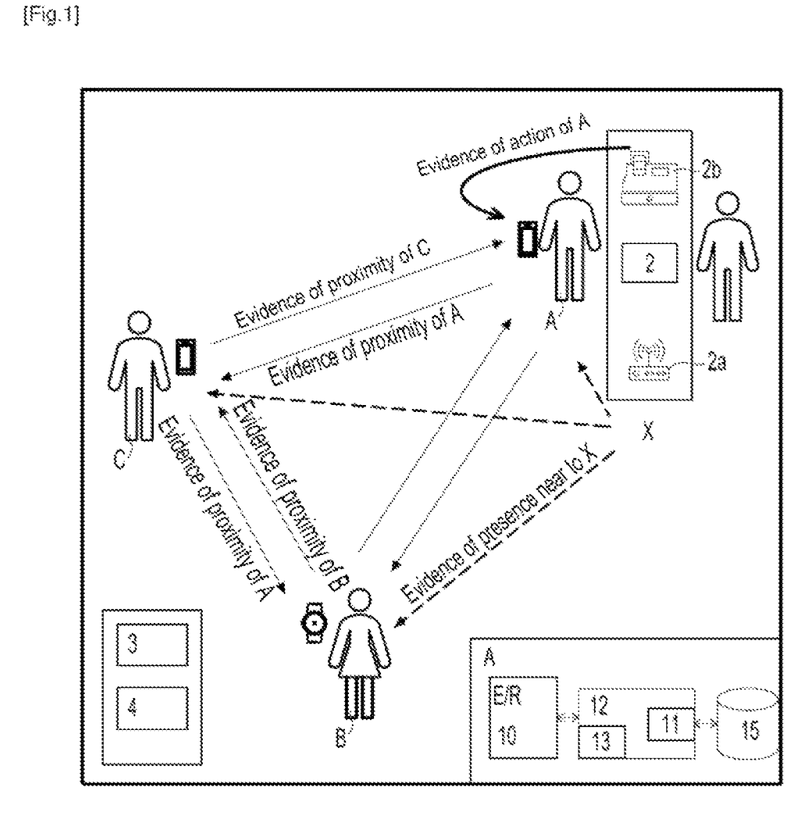
FIG. 1 shows a general diagram of exchange of evidence within the system according to the invention.

FIG. 1 illustrates a system composed of three individuals A, B and C, of a system for generating evidence comprising for example an action terminal 1 and a presence terminal 2, a broadcast server 3, a storage server 4. These elements communicate with one another via a communications protocol known to those skilled in the art, and using media such as Wifi, Bluetooth, etc.

The individual A who wishes to establish one or more pieces of evidence, for example the evidence of his/her presence in a given place, evidence of an action and/or evidence showing that he/she was located near to the other two individuals B and C, is in possession of a mobile terminal such as a mobile telephone, a tablet, a connected watch or, more generally, a connected object. The connected object comprises capacities for communicating with an environment, for storing digital data, for activating a search for evidence via a software application configured for "waking up" other user devices in order for the latter to look for evidence and transmit it. A piece of evidence is composed of a set of datestamped digital data characteristic of a localization of a person and/or of an action of this person.

The connected mobile terminal (individual A who wishes to build him/herself a database composed of evidence data) comprises a radio transmitter/receiver 10, a processor 11, an operating system 12 on which an evidence portfolio application 13 is executed and a module 14 configured for gathering evidence generated by other users or by the environment. The evidence portfolio application comprises a module 131 designed to generate presence evidence, a module 132 designed to generate proximity evidence and a module 133 designed to generate action evidence. The mobile terminal may also comprise a memory 15 for local storage of the evidence.

The radio transmitter/receiver module is configured for communicating with the other users of the system via Wifi, radio, by automatic and fast transmission of the information from one device to another for example via NFC (Near Field Communication) transmission or BLE (Bluetooth Low Energy).

The connected mobile terminal is configured so as to recover the presence, proximity or action evidence that will be processed by the evidence portfolio application of an individual.

The evidence portfolio application installed on the connected mobile terminal of an individual in particular has the function of managing various types of evidence that a user wishes to acquire and to conserve for a future use. This application notably has the function:
  Of displaying and storing evidence received by the user, such as presence evidence, proximity evidence and/or evidence of action or of use,
  Of generating at precise moments data proving the presence of a user in a given place or the proximity of a user to other users or to a device, or data associated with an action executed by the individual, the generation of these data may be carried out at regular intervals or left to the initiative of the user,
  Of storing these data, or at least a part of these data, associating with them an identifier, locally or on a data server, the identifier being a data value associated with a piece of evidence, valid for a time period specific to an individual,
  Of launching a search for an owner of evidence via a search server, for example the search for a user holding proximity evidence, or the search for an action evidence terminal,
  Of allowing an individual user to use a single piece of evidence or several pieces of evidence recovered in order to reinforce an action on a third-party service (comment on an online opinion service proving the authenticity of this opinion given by a user), or for a use in the case of a dispute or else for printing this information on a document or another medium.

The public device for generating evidence 2 takes the form of a presence terminal 2a and/or an action terminal 2b. A terminal may be associated with a given place.

A presence terminal 2a and/or an action terminal 2b comprises for example at least:
  Means of communication, transmission/reception, necessary for the transmission of evidence according to a chosen communications protocol, for example Bluetooth BLE, Wifi, Radio, NFC, etc.,
  A processing unit—crypto+generation of evidence prior to transmission—storage of evidence—data associated with a piece of evidence+datestamp,
  A device allowing the global positioning of the place to be verified (GPS chip, for example), notably in the case of presence evidence,
  A presence or action terminal notably allows:
    Presence or action evidence to be generated within a more or less wide radius,
    Single-use codes used for action evidence to be issued, allowing an individual and an action terminal to be associated in order to reinforce the level of a piece of evidence in the case of need.

The "broadcast" server 3 is a system having notably the function of sending messages for requests to a set of users equipped with the evidence portfolio application. For this purpose, the broadcast server stores tokens generated on the terminals of the users. This data value is anonymous. This search is triggered by a user when the latter searches for users who were within his/her vicinity at a given date.

The data storage server 4 is an open and distributed system accessible to all the users of the solution. It allows one or more pieces of evidence stored on a personal device to be uploaded onto it. This operation notably allows:
  Evidence to be saved in the case of loss or the theft of the connected terminal of a user,
  The freeing up of the memory space on the connected terminal of a user,
  The facility for sharing evidence between the various individuals present in the system, via their connected terminals.

The storage server basically guarantees the availability and the integrity of the evidence. The level of confidentiality of the evidence will be determined depending on the nature of the evidence, for example public evidence or private evidence.

The description gives a few detailed examples of evidence and of evidence structures. A piece of evidence is a set of digital data consisting for example of two parts, FIG. 2:
  A transmission data block 20, characterizing the evidence by the device issuing the evidence, public or personal; the transmission data block comprises datestamp parameters 21, an indicator 22 identifying a device at a given time, data for evidence of presence and/or of actions, 23, a signature 24 of the transmission data by a transmission device. These data are issued by a user or by a presence terminal which will generate data constituting evidence of action or of use,
  A received data block 25 added by the connected mobile terminal of the user after receiving the transmission data containing the parameters characterizing a piece of evidence, for example, datestamp data 26, an indicator 27 identifying a device at a given time for presence or proximity evidence, a signature of evidence by a receiving device 28, these data corresponding to a user who will receive evidence of use.

A piece of evidence is a data set that will allow the user to justify:
  His/her presence in a place X at a time t, with presence evidence (digital global positioning data) issued by a presence terminal, and/or
  His/her proximity with a person Y (individual Y) at a time t, with proximity evidence issued by the personal transmitter/receiver device of the person Y, and/or The performance of an action (or use), payment for a service for example, with action evidence (single-use code) issued by a public device for transmitting/receiving evidence.

During a first phase, an individual (user) will activate the "evidence portfolio" application installed on his/her connected mobile terminal by executing the steps described hereinafter.

During an authentication phase, the user logs onto the evidence portfolio application. The user logs onto the evidence portfolio application using the interface of his/her mobile terminal, for example a telephone, and inputs his/her identification data, his/her surname, his/her first name, his/her personal address or all the other data that will be useful for generating evidence data which are personal to them. In return, the evidence portfolio application will generate an access key to the evidence portfolio assigned to this user. The evidence portfolio application also generates an encryption key which will be used to protect the container designed to contain the evidence and which is loaded onto the mobile device of the user. The encryption key may take any kind of format known to those skilled in the art.

During a second phase, the evidence portfolio application will create a container on the connected mobile terminal. This container is a secure space created on the connected mobile terminal. It is used for storing the various elements needed for the correct operation of the application according to the invention. Access to it is protected by the access key generated by the user during the authentication phase. Optionally, a container whose access is protected by an access key may be created on a storage server. This creation takes place when the mobile device or mobile terminal is connected to the storage server and allows the storage of the data to be made secure.

By activating the evidence portfolio application, the user authorizes this application to use communication means needed for the correct operation of the system according to the invention. The communication between the system (other individuals situated within a given region or an action evidence device) and the user may take place via the Wifi technique, the mobile network, etc. The communication between the transmitter/receiver devices with which the users of the system are equipped takes place, for example, by means of the aforementioned systems Wifi, Bluetooth, NFC, etc.

When a user wants to recover data characteristic of evidence of use (action), presence evidence or other evidence, he/she will activate a device or driver for transmitting/receiving evidence. Once activated, this evidence transmitter/receiver driver is designed to generate keys and evidence. It listens and issues evidence destined for its environment. This evidence transmitter/receiver device activates the evidence portfolio application so as to issue a request for interrogation of possession of a piece evidence via the broadcast server to a set of individuals and/or of a device capable of holding presence, proximity or action evidence. The evidence request will subsequently be processed by the receiver, who will send to the user requesting evidence the information proving that the latter was in a given place, at a given date and time, or that the latter has carried out an action on a device, such as the payment for an article.

The description presents one example of the issuing and/or receiving of evidence by a user, given by way of illustration in order to better understand the subject of the invention.

There are notably two ways of collecting and of storing evidence issued by another user and/or by the environment, i.e., presence terminal, for example.

According to a first mode of operation, as soon as the user arrives within range of a device transmitting evidence, he/she receives a piece of evidence transmitted via the communications media. This evidence may be proximity evidence issued by another user of the system or presence evidence. The evidence is stored in the memory of the mobile terminal of the user and enhanced with datestamp and global positioning metadata. One example of a structure of evidence has been shown in FIG. 2, with the addition of datestamp and global positioning metadata being effected by techniques known to those skilled in the art. This type of data gathering and storage is carried out without intervention of the user, once the evidence portfolio application and the search engine are activated.

According to a second mode of operation, following an action carried out on a system, for example a cash register of a store, action evidence of payment for an object or for a service is issued and recorded on the device of the user. This type of data gathering requires a manipulation on the part of the user (scan of a QRCode, NFC read, etc.).

Figure 3:
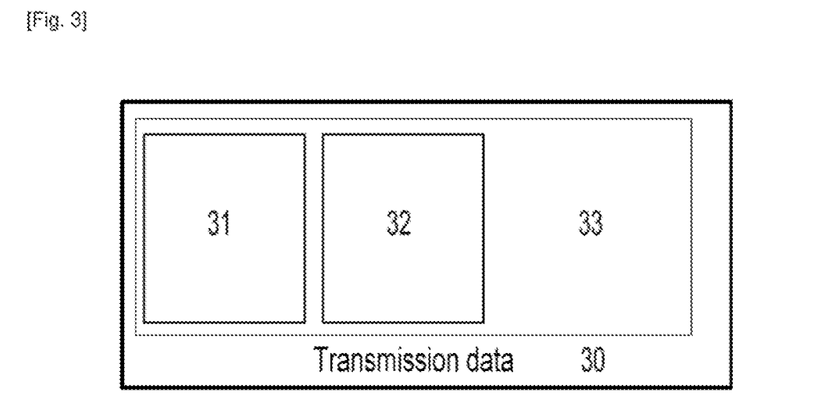
FIG. 3 shows one example of a format of proximity evidence.

FIG. 3 illustrates one example of a data format for proximity evidence. Proximity evidence is issued by a user terminal which will issue proximity evidence at regular intervals and in a continuous manner, every N seconds or minutes. Without straying from the framework of the invention, it is possible for a user terminal to broadcast this evidence at any moment in time, at time intervals of variable size.

The proximity evidence transmission data block is for example composed of the elements listed hereinafter.

A part containing datestamp parameters, 31, one or more of the following time parameters:
The Year
The Month
The Day
The Hour
The Minute
The Second A generation number UUID (Universally Unique Identifier), 32, known to those skilled in the art: this is a number unique to a personal device valid for a given and limited period of time; this number is associated with the issuing and/or receiving of proximity evidence and depends on the apparatus or device having issued it; it may be different at each issuing of evidence, A signature of the transmission data, 33:
The generation of a transmission Hash: imprint formed by a hash function (Sha-2, Sha-3, etc.) on all of the transmission data (evidence data issued by an individual or a public device) in order to render the data secure: Datestamp, UUID. Any other data security software application may be used,
A signature of the Hash by a private key of the evidence transmission device.

Figure 4:
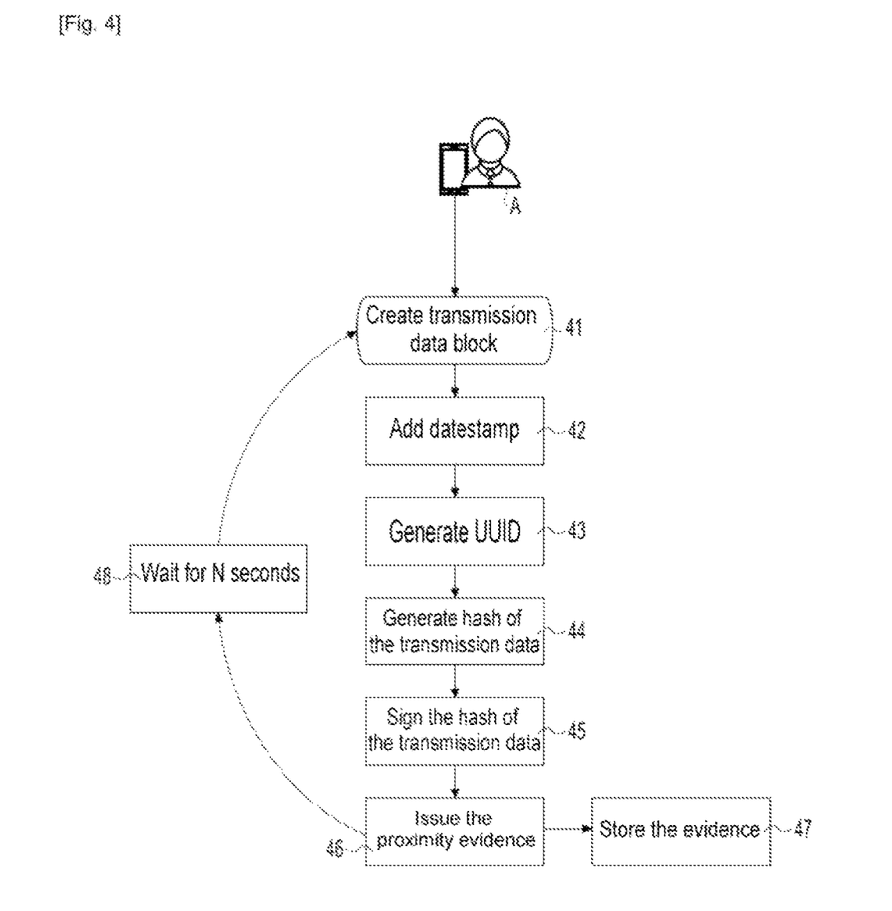
FIG. 4 shows a flow diagram of the steps of the process of generation of proximity evidence.

FIG. 4 illustrates the steps executed on a proximity evidence generation and transmission application by one of the users present in the system, implemented by a transmitter/receiver device. The application executes successively the following steps: the generation of a transmission data block 41, the addition of datestamp parameters 42, the generation of a transmission number 43, the generation of a transmission data hash 44, the signature of the transmission data hash 45, the issuing of the proximity evidence 46, the storage of the evidence in the evidence portfolio application 47. The steps are repeated 48 every N seconds, for example, or according to another timing scenario defined according to the application.

Figure 5:
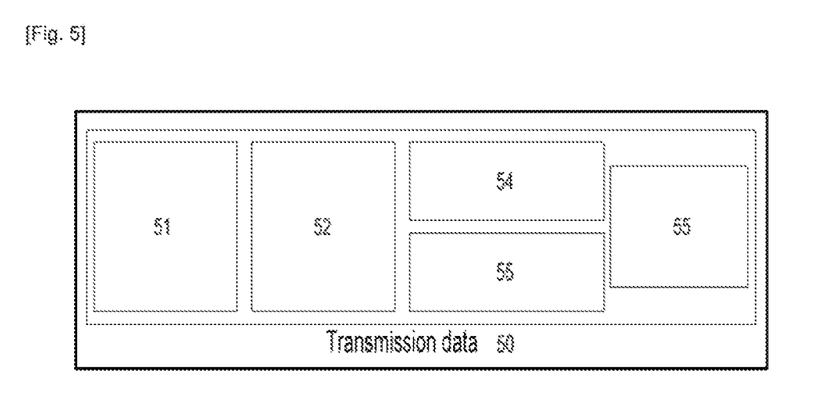
FIG. 5 shows one example of a format of presence evidence.

FIG. 5 illustrates a data format constituting presence evidence. The presence evidence is issued by presence evidence issuing public devices, for example by a presence terminal.

The presence terminal issues presence evidence at regular intervals, for example every N seconds or minutes and in a continuous manner, for example.

The transmission data block for presence evidence has virtually the same format as that for proximity evidence. It contains in addition a presence data block. This presence data block contains elements specific to the device issuing this presence evidence:

The identifier of the presence terminal, 51,
The address of the place where the presence terminal, 52, is located,
The GPS coordinates or the address of the place where the presence terminal, 53, is located,
The block issuing proximity evidence 54 and the signature of the transmission data by the transmission device 55.

Figure 6:
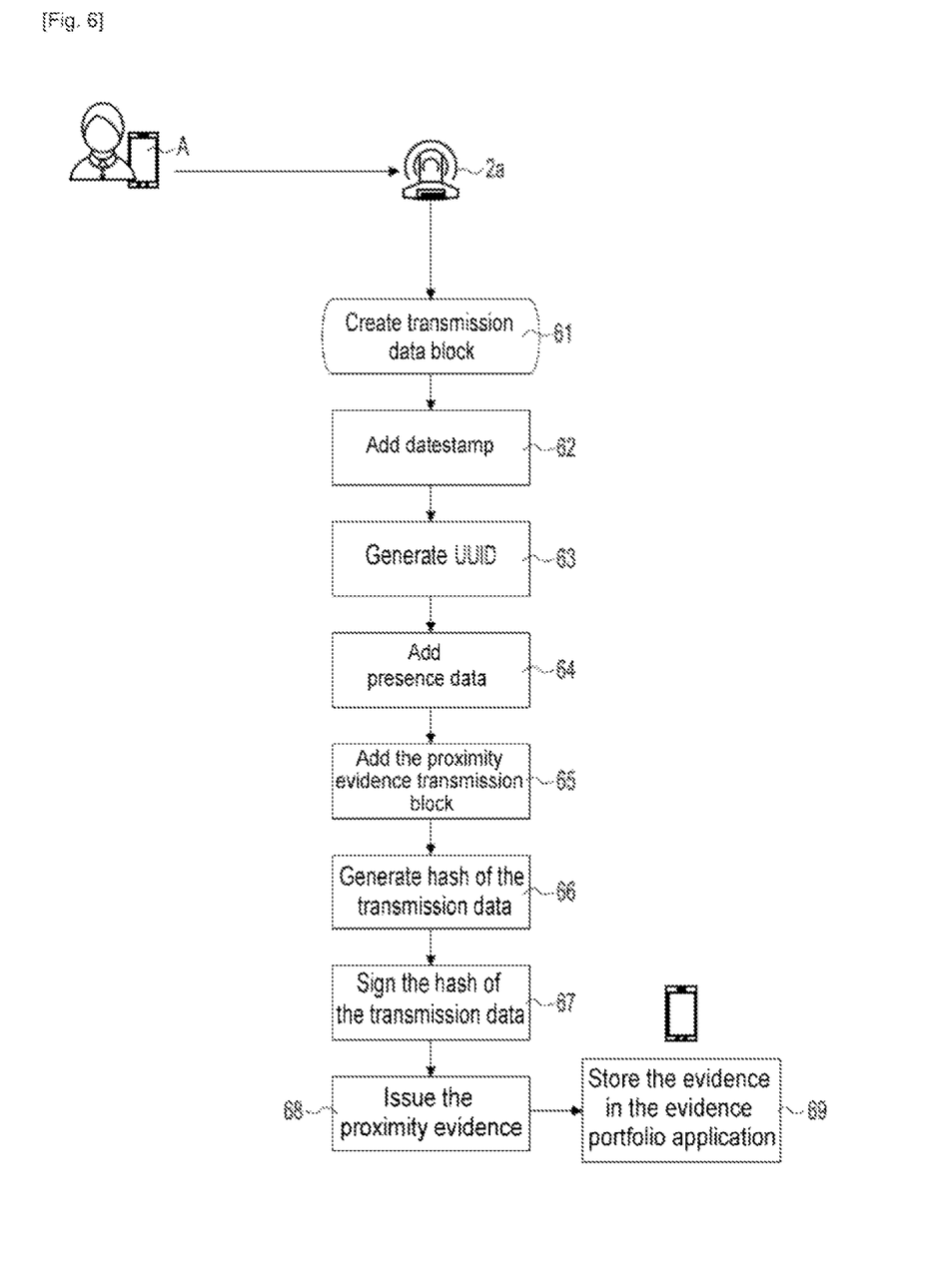
FIG. 6 shows a flow diagram of the steps of the process of generation of presence evidence.

FIG. 6 is one example illustrating the steps for issuing presence evidence by a presence terminal. The issuing of the presence evidence will take into account the proximity evidence previously issued.

The public transmission device or presence terminal receives proximity evidence transmitted by a user requesting a piece of evidence. The presence terminal generates a transmission data block 61 comprising at least the following information: datestamp parameters 62, the identifier of the public transmission device 63, the presence data 64, the addition of the proximity data 65, the data contained in the received proximity evidence, then it generates a hash of the transmission data 66 and a signature of the hash 67. Using this information, the presence terminal will issue presence evidence 68 which will be stored in the evidence portfolio application 69, for example of the user requesting the evidence.

Action evidence is issued by a public device for issuing action evidence or action terminal. Action evidence will only be issued when an "action" is carried out by a user (payment for an object, for a service, etc.) on the action terminal.

Figure 7:
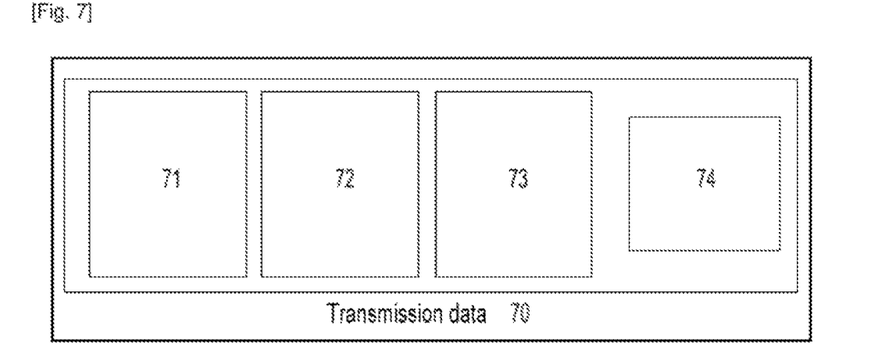
FIG. 7 shows one example of a format of action presence evidence.

FIG. 7 illustrates one example of a structure of action evidence.

The transmission data block for action evidence is the same as for proximity evidence except that it contains additionally an action data block encrypted by the public key of the client. This action data block contains elements characteristic of the action performed, for example:

Datestamp (issuing of the action data), 71,
The action identifier, 72,
The type of action, 73,
The metadata characterizing the action, depending on the type, 74.

Figure 8:
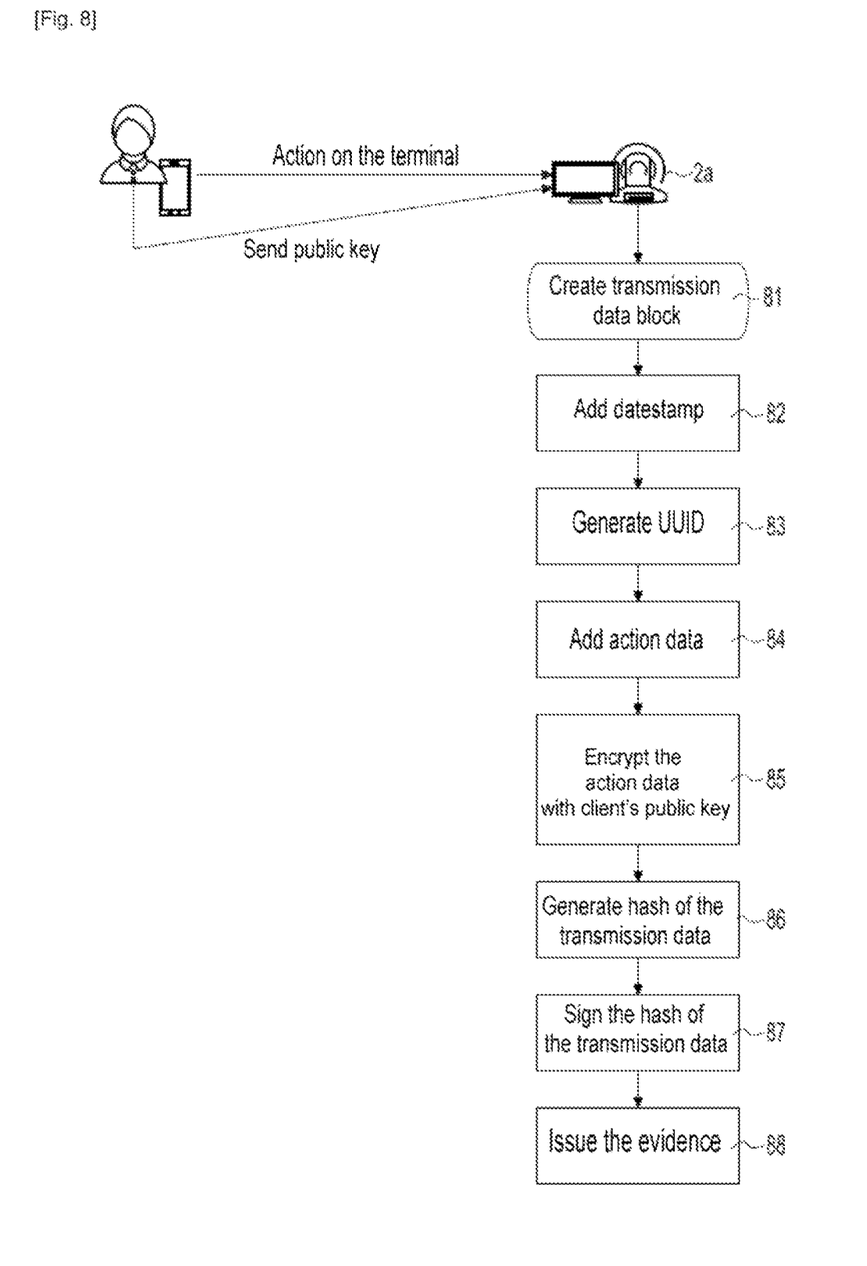
FIG. 8 shows a flow diagram of the steps of the process of generation of action evidence.

FIG. 8 illustrates one example of steps implemented by the process for issuing action evidence.

A user triggers an action on the action terminal, for example, the payment for a transaction or for an object on a cash register and simultaneously he/she transmits his/her public key.

Upon receiving the action and the public key from the user, the action terminal 2b generates a transmission data block 81 comprising datestamp parameters 82, the identifier of the action terminal, 83, the data associated with the action 84. During the following step, the action terminal will encrypt the action data with the public key of the user, 85, then will generate a hash of the transmission data, 86, and a signature of the hash of the transmission data 87. The terminal subsequently issues the associated action evidence 88 for local storage, 89, with the user and/or on the storage server.

The outcome of the steps described hereinabove is that a user has the capacity to issue various types of evidence that he/she will have stored—presence, proximity and/or action evidence—and to print it in the form of a document to be used in various contexts.

Figure 9:
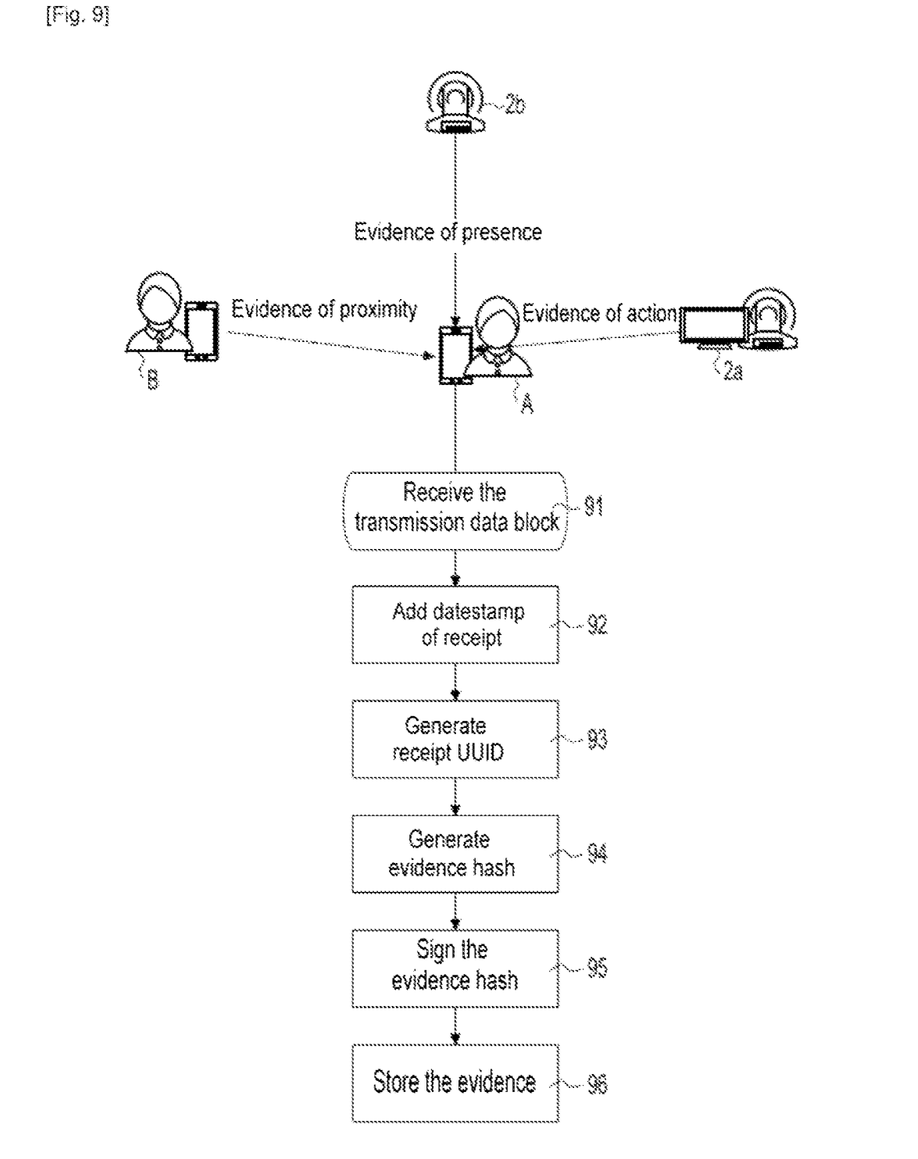
FIG. 9 shows a flow diagram of the steps of the process of generation of a piece of evidence.

In FIG. 9, the description presents one example of use by a user of the three types of evidence previously introduced, allowing the system according to the invention, presented by way of non-limiting illustration, to be understood. Without straying from the framework of the invention, a user could make use of only one of the types of evidence.

The three types of evidence are received exclusively by the personal devices for receiving/transmitting evidence with which a user is equipped and the evidence is managed by the evidence portfolio application of a user.

The user who wishes to build him/herself a set of evidence receives, for example, one or more of the following types of evidence: proximity evidence issued by another user, presence evidence issued by a presence terminal and action evidence issued by an action terminal. The transmission of these evidence-of-use data is carried out, for example, automatically via the communications protocol used in the system and the media support.

Figure 2:
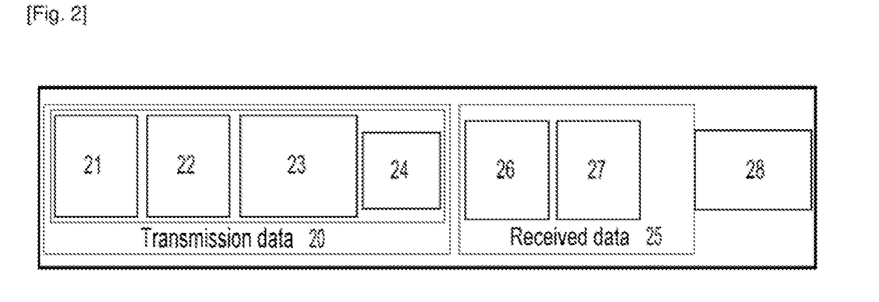
FIG. 2 shows one example of the final format of the data forming a piece of evidence.

After receiving one or more of these three types of evidence, the user adds reception datestamp parameters, generates an identifier, an evidence hash and stores the three types of evidence in the evidence portfolio application, as is illustrated in FIG. 2.

In this system, it is the user A, requestor of evidence of use, who decides to trigger the applications. For this reason, only the user who wishes to obtain evidence of use has the control of the evidence that he/she gathers. He/she may decide to share it with a specific entity (person, authority, service, etc.) or to make it public. An open and distributed system allows all the recipients of this evidence to verify its authenticity.

In order to verify that a person is the issuer or the receiver of a piece of evidence, the person must re-sign the issued or received data block, as the case may be. If the newly generated signature really does correspond to the evidence requested, its validity is confirmed. As for the proximity evidence, only the application of the person having issued this token is activated and asks the person having received it to confirm the deposition of his/her opinion.

For the signature, the third-party system contacts the device issuing the evidence sending to it the following blocks: the datestamp parameters 21, an indicator 22 identifying a device at a given time, presence and/or action evidence data, 23. The issuer signs these blocks and sends the signature back to the third-party system which compares it with the "original" signature (24). If the signatures match, this proves that the device is indeed the issuer of this evidence. This is because a digital signature of a data value will always be identical if it is effected with the same private key. Since the key is private, this proves that the issuing device is indeed the originator of the evidence and that its integrity is verified.

FIG. 9 illustrates one example of the steps implemented when a user A wishes to build him/herself a set of evidence by calling upon an individual with whom he/she has been in proximity, a presence terminal which is capable of indicating that he/she was in a place at a given date, an action terminal which has stored in memory an action executed by the user A.

For this purpose, the user transmits a request to the broadcast server. His/her request comprises a request to find proximity evidence, presence evidence and action evidence.

An action terminal which receives this request and which holds action evidence in its database will transmit this evidence to the user A. Similarly, a user who has been in the vicinity of the user A reads the request and if he/she possesses in memory proximity evidence corresponding to the request of the user A, he/she transmits this proximity evidence to this user. The presence terminal does the same. In the example, it is assumed that the user has received from the aforementioned three devices proximity, action and presence evidence. The user will add to these transmission data 91 datestamp parameters 92 and an indicator identifying the individual 93. The user A generates an evidence hash and a signature of the evidence hash, 94, 95. The following step consists in storing the evidence by the user A, 96, with the aim of a future use.

Figure 10:
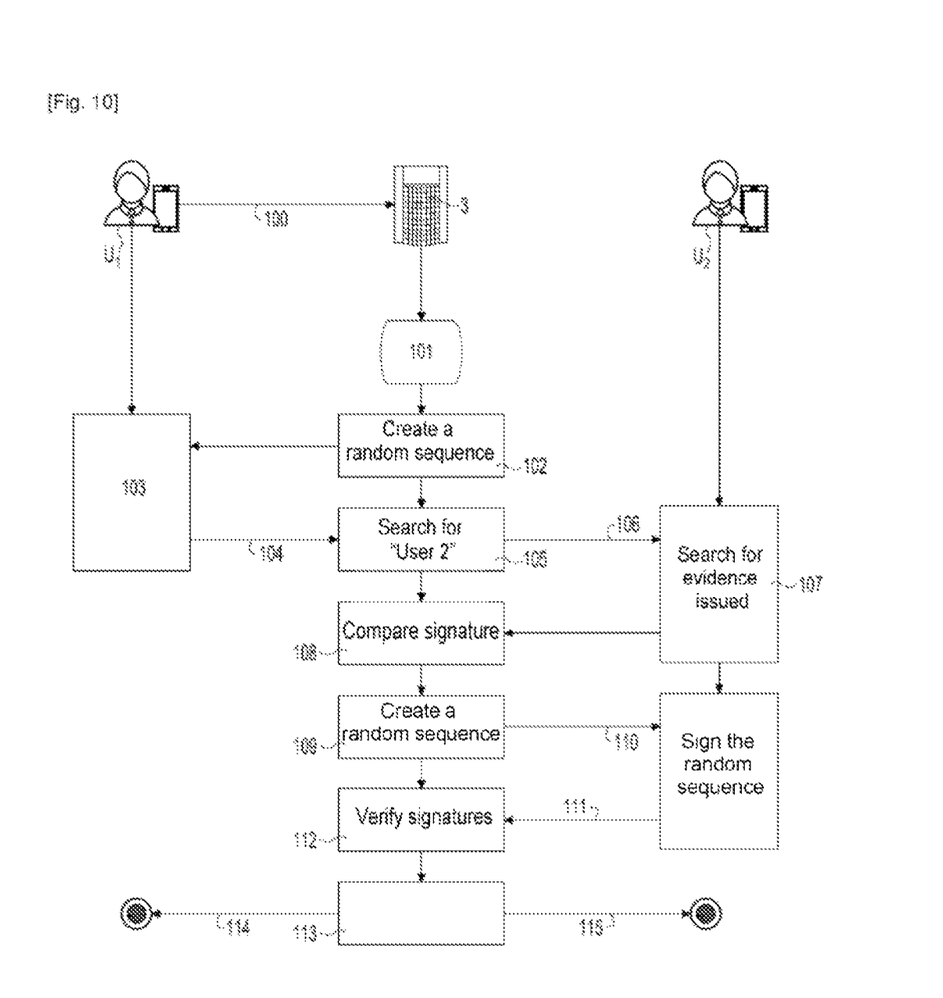
FIG. 10 shows a flow diagram of the steps of the process implemented by an individual in order to search for a piece of evidence.

FIG. 10 illustrates a succession of steps implemented by a user searching for proximity evidence with various users of a system and evidence of presence in a given place and at a given date.

A user $U_1$ who wishes to recover evidence of presence in a given place and proximity evidence will execute the steps illustrated in FIG. 10.

The user $U_1$ transmits a request for presence evidence to the broadcast server. The latter searches for a device issuing presence evidence, 101, and generates a random sequence 102. The random sequence is transmitted 103 to the user $U_1$ requesting evidence for signature. The user $U_1$ will sign the random sequence and retransmit it 104 to the broadcast server which triggers, 105, a procedure for searching for a user $U_2$ holding proximity evidence. The broadcast server transmits, 106, the identifier of the proximity evidence to the second user $U_2$. If the second user $U_2$ has the proximity evidence at his/her disposal, 107, he/she transmits to the broadcast server a message containing the signature of the transmission data of the proximity evidence. The broadcast server compares, 108, the signature transmitted by $U_2$ with the signature of the transmission block contained in the evidence in order to ensure that U2 is indeed in possession of the evidence, then generates a corresponding random sequence 109. The random sequence associated with the second user is transmitted to the latter for signature, 110, before retransmitting the signed random sequence, 121, to the broadcast server which verifies 112 the signature prior to establishing a contact, 113, between the first user $U_1$ requesting proximity evidence and the second user $U_2$ holding the proximity evidence by transmission, 114, 115, of the addresses of each of the users.

When a user wishes to recover one or more pieces of presence evidence, i.e., to prove his/her presence in a place, on a third-party system, the following process is launched:

The user shares the evidence with the third-party system and proves that he/she is indeed the recipient of the evidence, The third-party system contacts the terminal of the place in question in order to verify that it is indeed the issuer of this evidence. For this purpose, the third-party service sends the received data block to the broadcast server which is responsible for transmitting the datestamp and the UUID identifier for receipt of the storage block encompassing, for example, all of the public evidence generated by public devices. If the evidence is found and indeed corresponds to the place indicated by the user, the third-party service receives a confirmation and can then authorize the action (deposition of an opinion, reservation, publication of an article, etc.).

The invention claimed is:

1. A method for generating and saving a set of digital data or evidence associated with an individual, within a system comprising several devices issuing and receiving evidence and a medium for communicating between said devices, wherein the method comprises at least the following steps:

for the generation of the data constituting a piece of evidence:

for a device issuing a piece of evidence, defining a data block characterizing the evidence, the data block comprising at least one datestamp parameter, an indicator identifying said device issuing the evidence, and evidence data as a signature of the transmission data by a transmission device, for the individual wishing to build him/herself a set of evidence, adding to the received data block data characterizing a piece of evidence, a datestamp parameter, an indicator identifying the device receiving a piece of evidence, and an evidence signature, in order to use a piece of evidence:

an individual issues a request containing said evidence proving that he/she is the recipient of this evidence to a third-party system, said third-party system contacts the device issuing the evidence sending to it at least said datestamp parameter, said indictor identifying the device issuing the evidence, and said evidence data, the issuer signs said blocks and sends the signature back to the third-party system which compares said signature with said original signature, in order for the third-party system to validate the evidence in the case where the signatures match.

2. The method of claim 1, further comprising the following steps:

a device issuing proximity evidence generates a set of transmission data composed of a part containing datestamp parameters, a transmission identifier of the device issuing the evidence, a signature of the transmission data, an individual receives proximity evidence issued by an issuing device and stores said proximity evidence adding datestamp data and data identifying the proximity evidence receiver device, in order to search for proximity evidence, said individual issues an evidence search request to a third-party system which transmits the datestamp data contained in the request and the indicator to the server storing the data.

3. The method of claim 1 further comprising the following steps:

a presence terminal:

generating a transmission data block comprising at least a datestamp parameter, an identifier, and proximity data, generating an encryption file from the data (hash) and signing the encrypted data, issuing the presence evidence to a user requesting said data, said user storing said presence evidence after having added datestamp data and an indicator of the device receiving the evidence, in order for an individual to search for presence evidence, said individual issues an evidence search request to a third-party system which transmits the datestamp data contained in the request and his/her identifier to the server storing the data, and when the evidence is recovered in the storage of the data, the third-party service validates the evidence.

4. The method of claim 1, further comprising at least the following steps:

a device generates action evidence by transmitting to an individual a data set containing datestamp parameters, an identifier, and data characterizing the action, then encrypts the data with a public key of the individual, generates a hash and a signature of the hash of the transmission data, and said device issues action evidence to the individual and/or onto a storage space.

5. The method of claim 1, further comprising the following steps:

an evidence search request is transmitted by a first user $U_1$ to a broadcast server, the broadcast server searches for an evidence issuing device and generates a random sequence, the random sequence is transmitted to the user $U_1$ for signature, the user $U_1$ signs the random sequence and retransmits it to the broadcast server which triggers a procedure to search for a user $U_2$ holding a piece of evidence requested by the first user, the broadcast server transmits the identifier of the proximity evidence to the second user $U_2$, if the second user $U_2$ has the evidence at his/her disposal, he/she transmits to the broadcast server a message containing the signature of the transmission data of the proximity evidence, the broadcast server compares the signature transmitted by the second user $U_2$ with the signature of the transmission block contained within the evidence in order to ensure that the second user U2 is in possession of the evidence, then generates a corresponding random sequence, the random sequence associated with the second user $U_2$ is transmitted to the latter for signature prior to retransmission of the signed random sequence to the broadcast server which verifies the signatures prior to establishing a communication between the first user $U_1$ requesting proximity evidence and the second user $U_2$ holding the evidence of use by transmission of the addresses of each of the users.

6. A system for building a data set corresponding to a piece of evidence associated with a first user $U_1$ within a system comprising one or more evidence issuing devices communicating with one another via a communications protocol, a broadcast server and a storage space, wherein the system comprises at least the following elements:

a device issuing the evidence is equipped with communication means and with an application configured for generating a data set comprising a datestamp data value, an identifier, data characterizing a piece of evidence, and a parameter for signature of the data, said first user is equipped with communication means and with an evidence portfolio application configure for adding to a received data set datestamp parameter, an indicator identifying the device issuing the data set, a signature, and an encryption key, a third-party device configured for contacting the device issuing the evidence sending to it at least said datestamp parameter, said indicator identifying the device issuing the evidence, said evidence data, the issuer signs said blocks and sends the signature back to the third-party system configured for comparing said signature with said original signature, and for validating the evidence when the signatures match.

7. The system of claim 6, further comprising a transmitter/receiver means configured for communicating via Wifi, radio, or Bluetooth.

8. The system of claim 6, wherein the storage space is located on a storage server.

9. The system of claim 6, wherein a device issuing the evidence is an action terminal configured for issuing a piece of evidence indicating that an action has been carried out by an individual.

* * * * *